US012579007B2

(12) United States Patent
Yeom et al.

(10) Patent No.: US 12,579,007 B2
(45) Date of Patent: Mar. 17, 2026

(54) CLUSTER COMPUTING SYSTEM AND OPERATING METHOD THEREOF

(71) Applicant: SAMSUNG ELECTRONICS CO., LTD., Suwon-si (KR)

(72) Inventors: Heonyoung Yeom, Seoul (KR); Hwajung Kim, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 828 days.

(21) Appl. No.: 17/846,651

(22) Filed: Jun. 22, 2022

(65) Prior Publication Data

US 2022/0413940 A1      Dec. 29, 2022

(30) Foreign Application Priority Data

Jun. 23, 2021     (KR) ........................ 10-2021-0081824

(51) Int. Cl.
G06F 9/50          (2006.01)
G06F 9/48          (2006.01)

(52) U.S. Cl.
CPC .......... G06F 9/5083 (2013.01); G06F 9/4881 (2013.01); G06F 9/5038 (2013.01); G06F 9/5077 (2013.01); G06F 2209/505 (2013.01)

(58) Field of Classification Search
None
See application file for complete search history.

(56) References Cited

U.S. PATENT DOCUMENTS 5,355,497 A * 10/1994 Cohen-Levy .......... G06Q 10/10
5,829,023 A * 10/1998 Bishop .................. G06F 12/121
                                                          711/E12.07

(Continued)

FOREIGN PATENT DOCUMENTS

KR       10-2019-0111124 A      10/2019
KR           10-2034833 B1      10/2019
KR       10-2020-0098971 A       8/2020

OTHER PUBLICATIONS

Hui Sun et al., "DStore: A Holistic Key-Value Store Exploring Near-Data Processing and On-Demand Scheduling for Compaction Optimization", IEEE Access, vol. 6, Digital Object Identifier 10.1109/access.2018.2873579, Oct. 2018, 21 pages total.

(Continued)

*Primary Examiner* — Adam Lee
(74) *Attorney, Agent, or Firm* — Sughrue Mion, PLLC

(57)          ABSTRACT

A cluster computing system is provided. The cluster computing system includes: a host including a first processor and a first buffer memory; computing nodes, each of which includes a second processor and a second buffer memory configured to store data received from the host; a network configured to connect the host and the computing nodes; and storage devices respectively corresponding to the computing nodes. The first processor is configured to control a task allocator to monitor a task performance state of each of the computing nodes, select at least one of the computing nodes as a task node, and distribute a background task to the task node, and the second processor of the task node is configured to perform the background task on sorted files stored in the second buffer memory, the sorted files being received by the second buffer memory from the first buffer memory.

20 Claims, 9 Drawing Sheets

(56) References Cited

U.S. PATENT DOCUMENTS

| | | | | |
|---|---|---|---|---|
| 5,852,822 | A * | 12/1998 | Srinivasan | G06F 16/2246 |
| 7,194,551 | B1 * | 3/2007 | Moll | H04W 8/205 |
| | | | | 709/240 |
| 7,761,407 | B1 * | 7/2010 | Stern | G06F 16/2237 |
| | | | | 707/602 |
| 9,081,620 | B1 * | 7/2015 | Chaubal | G06F 11/3055 |
| 9,148,479 | B1 * | 9/2015 | Bhalerao | H04L 67/34 |
| 9,530,436 | B1 * | 12/2016 | Masiewicz | G11B 5/02 |
| 9,753,935 | B1 * | 9/2017 | Tobin | G06F 16/24568 |
| 10,223,147 | B2 | 3/2019 | Carey et al. | |
| 10,691,658 | B2 | 6/2020 | Kameswaran et al. | |
| 10,725,988 | B2 | 7/2020 | Boles et al. | |
| 10,754,568 | B1 * | 8/2020 | Long | G06F 3/0605 |
| 10,824,600 | B2 | 11/2020 | Lebresne | |
| 10,884,629 | B1 * | 1/2021 | Kankani | G06F 3/0647 |
| 11,194,498 | B1 * | 12/2021 | Si | G06F 3/0608 |
| 11,249,952 | B1 * | 2/2022 | Andrews | G06F 16/16 |
| 2003/0101383 | A1 * | 5/2003 | Carlson | G06F 16/1724 |
| | | | | 714/42 |
| 2004/0006555 | A1 * | 1/2004 | Yamamoto | G06F 16/328 |
| 2004/0024766 | A1 * | 2/2004 | Chung | G06F 16/182 |
| 2004/0158637 | A1 * | 8/2004 | Lee | G06F 9/505 |
| | | | | 709/229 |
| 2004/0221052 | A1 * | 11/2004 | Ramasubramanian | |
| | | | | H04L 12/427 |
| | | | | 709/230 |
| 2006/0161538 | A1 * | 7/2006 | Kiilerich | G06F 16/258 |
| 2006/0171236 | A1 * | 8/2006 | Atwood | G11C 7/1075 |
| | | | | 365/230.03 |
| 2006/0184939 | A1 * | 8/2006 | Sahoo | G06F 9/505 |
| | | | | 718/100 |
| 2007/0088869 | A1 * | 4/2007 | Kadota | G06F 3/1229 |
| | | | | 710/36 |
| 2009/0235016 | A1 * | 9/2009 | Yano | G06F 12/0246 |
| | | | | 711/135 |
| 2010/0183017 | A1 * | 7/2010 | Mori | H04L 67/1001 |
| | | | | 370/400 |
| 2010/0332717 | A1 * | 12/2010 | Maeda | G06F 12/0246 |
| | | | | 711/3 |
| 2011/0072208 | A1 * | 3/2011 | Gulati | G06F 3/067 |
| | | | | 711/E12.001 |
| 2012/0047189 | A1 * | 2/2012 | Staffer | G06F 16/1727 |
| | | | | 707/830 |
| 2012/0102369 | A1 * | 4/2012 | Hiltunen | G06F 11/008 |
| | | | | 714/48 |
| 2013/0179821 | A1 * | 7/2013 | Bauer | H04L 41/0686 |
| | | | | 711/104 |
| 2013/0191519 | A1 * | 7/2013 | Chang | G06F 9/5066 |
| | | | | 709/223 |
| 2013/0198723 | A1 * | 8/2013 | Gupta | G06F 9/44 |
| | | | | 717/127 |
| 2014/0188819 | A1 * | 7/2014 | Bagal | G06F 16/1734 |
| | | | | 707/692 |
| 2014/0188870 | A1 * | 7/2014 | Borthakur | G06F 16/22 |
| | | | | 707/736 |
| 2014/0201175 | A1 * | 7/2014 | Ohno | G06F 16/1744 |
| | | | | 707/693 |
| 2014/0297601 | A1 * | 10/2014 | Pruner | G06F 16/215 |
| | | | | 707/692 |
| 2014/0297653 | A1 * | 10/2014 | Liu | G06F 16/245 |
| | | | | 707/747 |
| 2014/0304402 | A1 * | 10/2014 | Prakash | H04L 43/08 |
| | | | | 709/224 |
| 2014/0330817 | A1 * | 11/2014 | Eleftheriou | G06F 3/0659 |
| | | | | 707/722 |
| 2015/0120656 | A1 * | 4/2015 | Ramnarayanan | G06F 16/1744 |
| | | | | 707/616 |
| 2015/0120684 | A1 * | 4/2015 | Bawaskar | G06F 16/137 |
| | | | | 707/693 |
| 2015/0199214 | A1 * | 7/2015 | Lee | G06F 9/505 |
| | | | | 718/102 |
| 2015/0358430 | A1 * | 12/2015 | Ishaq | H04L 67/01 |
| | | | | 709/203 |
| 2016/0026537 | A1 * | 1/2016 | Mizuno | G06F 11/1451 |
| | | | | 711/118 |
| 2016/0094641 | A1 * | 3/2016 | Rahman | H04L 41/0816 |
| | | | | 718/1 |
| 2016/0371104 | A1 * | 12/2016 | Zamir | G06F 9/45533 |
| 2017/0302586 | A1 | 10/2017 | Suchter et al. | |
| 2018/0210795 | A1 * | 7/2018 | Fang | G06F 11/1446 |
| 2018/0260159 | A1 * | 9/2018 | Hall | G06F 3/0656 |
| 2018/0285086 | A1 * | 10/2018 | O'Malley | G06F 8/65 |
| 2019/0004768 | A1 * | 1/2019 | Li | G06F 7/24 |
| 2019/0042098 | A1 * | 2/2019 | Li | G06F 3/0644 |
| 2019/0213052 | A1 * | 7/2019 | Arikuma | G06F 9/50 |
| 2019/0235758 | A1 * | 8/2019 | Constantinescu | G06F 3/0643 |
| 2019/0236156 | A1 * | 8/2019 | Fanghaenel | G06F 16/2246 |
| 2019/0294715 | A1 * | 9/2019 | Gupta | G06F 9/544 |
| 2020/0019331 | A1 * | 1/2020 | Ren | G06F 16/1724 |
| 2020/0151268 | A1 * | 5/2020 | Johnson | G06F 16/2246 |
| 2020/0183905 | A1 * | 6/2020 | Wang | G06F 16/2246 |
| 2020/0210087 | A1 * | 7/2020 | Mannaly | G06F 3/0661 |
| 2020/0225882 | A1 * | 7/2020 | Li | G06F 12/0246 |
| 2020/0341678 | A1 * | 10/2020 | Jin | G06F 3/0653 |
| 2020/0341889 | A1 * | 10/2020 | Idreos | G06F 16/1734 |
| 2020/0344067 | A1 * | 10/2020 | Fradkin | H04L 67/1097 |
| 2020/0351336 | A1 * | 11/2020 | Campbell | H04L 67/1008 |
| 2020/0351339 | A1 * | 11/2020 | Savir | H04L 67/59 |
| 2020/0382621 | A1 * | 12/2020 | Moreira | G06F 9/452 |
| 2021/0011779 | A1 * | 1/2021 | Fang | G06F 3/0605 |
| 2021/0048962 | A1 * | 2/2021 | Karkra | G06F 3/0688 |
| 2021/0073001 | A1 | 3/2021 | Rogers et al. | |
| 2021/0165805 | A1 * | 6/2021 | Xie | G06F 16/278 |
| 2021/0182202 | A1 * | 6/2021 | Jin | G06F 12/0811 |
| 2021/0311943 | A1 * | 10/2021 | Kondiles | G06F 16/2456 |
| 2021/0349866 | A1 * | 11/2021 | Kim | G06F 16/215 |
| 2021/0374157 | A1 * | 12/2021 | Reddy | G06F 16/275 |
| 2021/0397345 | A1 * | 12/2021 | Jawahar | G06F 9/45558 |
| 2022/0113900 | A1 * | 4/2022 | Um | G06F 12/0804 |
| 2022/0113908 | A1 * | 4/2022 | Kim | G06F 12/0882 |
| 2022/0114164 | A1 * | 4/2022 | Krishnaswamy | G06F 16/219 |
| 2022/0156231 | A1 * | 5/2022 | Wang | G06F 16/9027 |
| 2022/0319597 | A1 * | 10/2022 | Moyer | G11C 15/046 |
| 2022/0335028 | A1 * | 10/2022 | Xue | G06F 16/2246 |
| 2022/0405127 | A1 * | 12/2022 | Huo | G06F 9/5027 |

OTHER PUBLICATIONS

Teng Zhang et al., "FPGA-Accelerated Compactions for LSM-based Key-Value Store", Proceedings of the 18th USENIX Conference on File and Storage Technologies, 2020, 15 pages total.

Xuan Sun et al., "FPGA-based Compaction Engine for Accelerating LSM-tree Key-Value Stores", 2020 IEEE 36th International Conference on Data Engineering (ICDE), DOI 10.1109/ICDE48307.2020.00113, 2020, 13 pages total.

Wei Cao et al., "Polardb Meets Computational Storage: Efficiently Support Analytical Workloads in Cloud-Native Relational Database", Proceedings of the 18th USENIX Conference on File and Storage Technologies, 2020, 15 pages total.

* cited by examiner

CLUSTER COMPUTING SYSTEM AND OPERATING METHOD THEREOF

CROSS-REFERENCE TO RELATED APPLICATION

This application is based on and claims priority under 35 U.S.C. § 119 to Korean Patent Application No. 10-2021-0081824, filed on Jun. 23, 2021, in the Korean Intellectual Property Office, the disclosure of which is incorporated by reference herein in its entirety.

BACKGROUND

The present disclosure relates to a computing system, and more particularly, to a cluster computing system for distributing resources in a heterogeneous cluster environment and an operating method of the cluster computing system.

In order to implement a large-capacity database, a cluster computing system connecting a plurality of computing nodes to a high-speed network has been proposed. The cluster computing system may be provided in a heterogeneous cluster environment where a plurality of computing nodes of a cluster have different resource configurations and operational performances. The cluster computing system may include, as a separate element, a host which distributes tasks.

SUMMARY

One or more example embodiments provide a cluster computing system, which distributes tasks on the basis of an available resource in a heterogeneous cluster environment, and an operating method of the cluster computing system.

According to an aspect of an example embodiment, a cluster computing system includes: a host including a first processor and a first buffer memory; a plurality of computing nodes, each of the plurality of computing nodes including a second processor and a second buffer memory configured to store data received from the host; a network configured to connect the host and the plurality of computing nodes; and a plurality of storage devices respectively corresponding to the plurality of computing nodes. The first processor is configured to control a task allocator to monitor a task performance state of each of the plurality of computing nodes, select at least one of the plurality of computing nodes as a task node based on the task performance state of each of the plurality of computing nodes, and distribute a background task to the task node. The second processor of the task node is configured to perform the background task on sorted files stored in the second buffer memory, the sorted files being received by the second buffer memory from the first buffer memory via the network.

According to an aspect of an example embodiment, a cluster computing system includes: a host including a first processor and a first buffer memory; a plurality of computing nodes, each of the plurality of computing nodes including a second processor; a network configured to connect the host and the plurality of computing nodes; and a plurality of storage devices respectively corresponding to the plurality of computing nodes. The first processor is configured to search for data including key information in the first buffer memory, according to a data search request including the key information received from a client. The second processor of each of the plurality of computing nodes is configured to receive the key information from the host, search a storage device connected to thereto for the data including the key information, and return the data including the key information to the host.

According to an aspect of an example embodiment, an operating method of a cluster computing system includes: receiving, by a host, a data insertion request from a client; monitoring, by the host, a task performance state of each of a plurality of computing nodes; selecting, by the host, at least one computing node as a task node based on the task performance state of each of the plurality of computing nodes; transmitting, by the host, data stored in a first buffer memory of the host to a second buffer memory of the task node; performing, by the task node, a background task; and updating, by the host, the task performance state of each of the plurality of computing nodes.

BRIEF DESCRIPTION OF THE DRAWINGS

The above and other aspects, features, and advantages will be more clearly understood from the following detailed description taken in conjunction with the accompanying drawings, in which.

DETAILED DESCRIPTION

Figure 1:
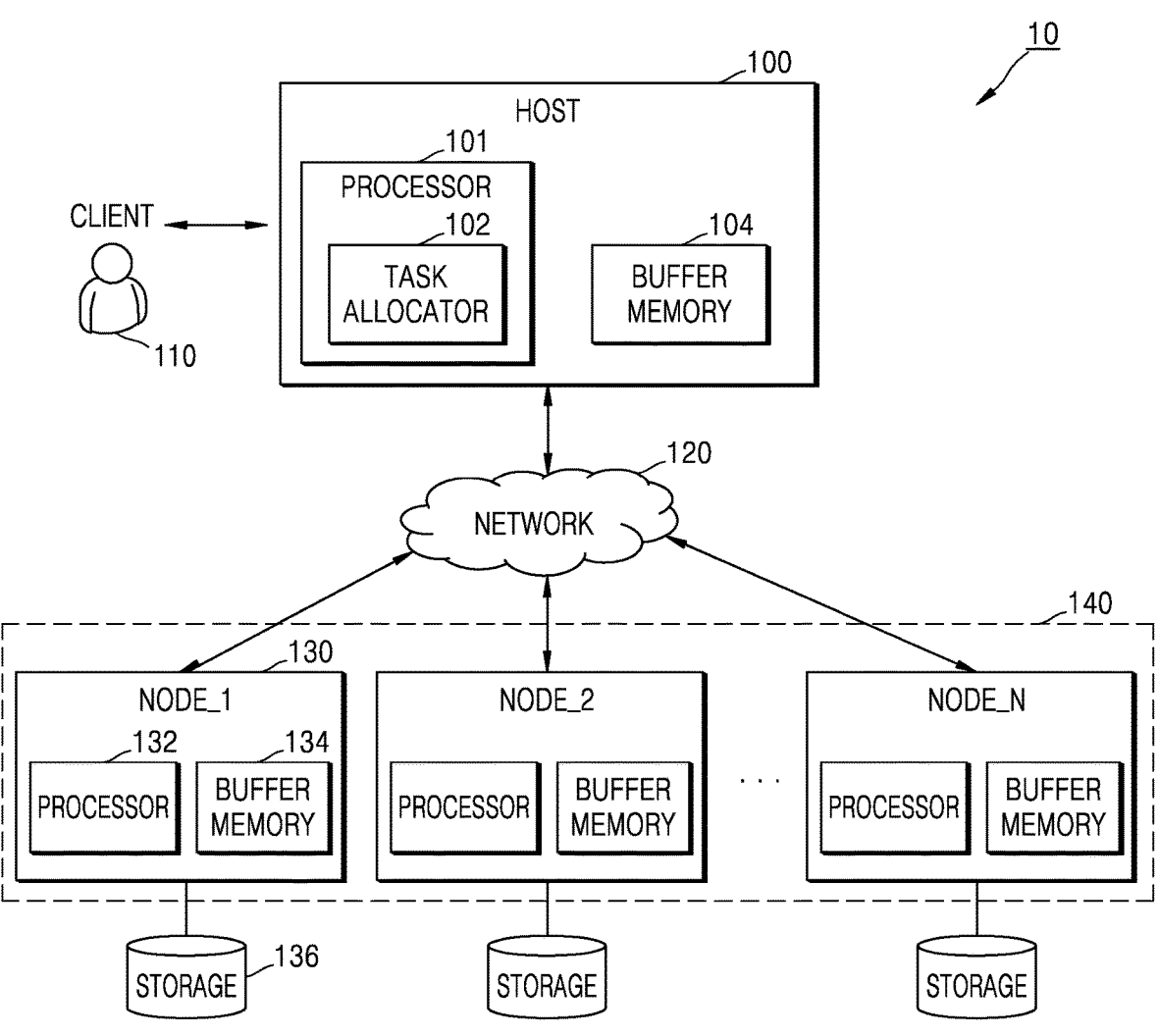
FIG. 1 is a block diagram illustrating a cluster computing system according to an example embodiment.

Hereinafter, example embodiments will be described in detail with reference to the accompanying drawings. Hereinafter, in the drawings and descriptions, an element illustrated or described as one block may be a hardware block or a software block. For example, elements may be independent hardware blocks for transferring and receiving a signal therebetween, or may be software blocks executed by one or more processors. Also, the term "system" or "database" described herein may denote a computing system which includes at least one processor and a memory accessed by the processor.

FIG. 1 is a block diagram illustrating a cluster computing system 10 according to an example embodiment.

Referring to FIG. 1, the cluster computing system 10 may include a host 100, a network 120, and a plurality of computing nodes 140. The cluster computing system 10 may denote one system which connects the plurality of computing nodes 140, which operate independently, to the network 120. The cluster computing system 10 may distribute and store data, received from the client 110, to and in the plurality of computing nodes 140, and the plurality of computing nodes 140 may process the stored data in parallel. For example, the cluster computing system 10 may be used in a database and a distributed parallel computing system.

The cluster computing system 10 according to an example embodiment may include a key-value database or a key-value store. The cluster computing system 10 may insert, search and delete data by using a key-value pair. The key-value pair may denote a key-value pair including a key, which is a unique identifier, and data corresponding to the key. For example, the key-value pair may be referred to as a key-value tuple. The cluster computing system 10 may receive key information from the client 110 and may return data corresponding to the key information, thereby enhancing a search speed of data.

The host 100 may include a frontend server which cooperates with the client 110, in the cluster computing system 10. The host 100 may offload a task to the plurality of computing nodes 140 according to a data processing request received from the client 110. The host 100 may monitor a task performance state of each of the plurality of computing nodes 140, select one of the plurality of computing nodes as a task node on the basis of the task performance state, and distribute a background task to the task node in real time. For example, when the host 100 receives a data write request from the client 110, the host 100 may offload the background task for writing data in the task node. When the host 100 receives a data search request from the client 110, the host 100 may offload, a search task performed on data stored in a storage device 136, to the task node. The host 100 may receive a search result obtained by the task node and may transfer the search result to the client 110.

The host 100 may include a first processor 101 and a first buffer memory 104. The first processor 101 may include a task allocator 102, and the task allocator 102 may monitor a task performance state of each of the plurality of computing nodes 140. For example, the task allocator 102 may determine the task performance state on the basis of at least one of the type and number of tasks performed by each of the plurality of computing nodes 140 and a task performing time for performing the tasks. The task allocator 102 may select, as a task node, at least one computing node from among the plurality of computing nodes 140 on the basis of the task performance state. The task allocator 102 may transmit data to a task node over the network 120. The task allocator 102 may update the task performance state of each of the plurality of computing nodes 140 in real time and may select a task node on the basis of the task performance state, thereby adjusting the balance of workloads between the plurality of computing nodes 140.

The host 100 may perform a foreground task according to the data processing request received from the client 110. The foreground task may denote a task of processing data in the first buffer memory 104. The first buffer memory 104 may be used as a cache memory so as to prevent performance from being reduced by a speed for accessing a storage layer. When the data processing request is received from the client 110, the host 100 may preferentially provide the client 110 with a data value obtained through processing performed in the first buffer memory 104, thereby enhancing a response time. For example, when the host 100 receives the data write request from the client 110, the host 100 may preferentially write data in the first buffer memory 104. When the host 100 receives a data search request from the client 110, the host 100 may read data from the first buffer memory 104 and may provide the data to the client 110. Subsequently, when a certain time elapses or an amount of data stored of the first buffer memory 104 is greater than a threshold value, the host 100 may flush data, stored in the first buffer memory 104, to the storage device 136 to permanently store the data therein.

The network 120 may connect the host 100 to the plurality of computing nodes 140. The plurality of computing nodes 140 may be connected to the network 120, and communication between nodes, and between nodes and the host 100 may be performed over the network 120. The host 100 may transmit data, received from the client 110, to the plurality of computing nodes 140 over the network 120 to distribute tasks. For example, when the task allocator 102 selects a first computing node 130 as a task node, the host 100 may transmit data to the first computing node 130 over the network 120. The task node may transmit an obtained calculation result to the host 100 over the network 120. For example, the network 120 may be implemented with a network switch, a switching hub, a router, or a port switching hub.

Each of the plurality of computing nodes 140 may include a second processor 132, which performs an arithmetic operation on data distributed from the task allocator 102, and a second buffer memory 134. For example, when the task allocator 102 selects the first computing node 130 as a task node, the host 100 may transmit data to the second buffer memory 134 of the first computing node 130 over the network 120. The second processor 132 may perform a background task on data stored in the second buffer memory 134. The background task may denote a task of transferring data, stored in the first buffer memory 104 of the host 100, to the second buffer memory 134 and merging (for example, compaction) the data or flushing the data to the storage device 136. The background task may be a task which is performed in a background and does not provide a separate output to the client 110.

In some example embodiments, each of the plurality of computing nodes 140 may be configured with a single board computer. For example, the second processor 132 and the second buffer memory 134 may be mounted on a single board. Each of the plurality of computing nodes 140 may further include an input/output (I/O) circuit mounted on the single board, and the I/O circuit may be connected to the storage device 136. For example, each of the plurality of computing nodes 140 may be implemented with a Raspberry Pi, Banana Pi, or MarsBoard. Each of the plurality of computing nodes 140 may be implemented with a single board computer having a minimum spec and may increase power efficiency.

Each of the plurality of computing nodes 140 may be connected to the storage device 136. The storage device 136 may store data in a disk region. For example, the storage device 136 may be implemented with a solid state drive (SSD) or a hard disk drive (HDD). According to an example embodiment, two or more different computing nodes may share the storage device 136.

The host 100 may offload the background task to the plurality of computing nodes 140 in a heterogeneous cluster environment, and thus, the cluster computing system 10 according to an example embodiment may prevent the performance of the foreground task performed by the host 100 from being reduced and may provide stable performance.

Figure 2:
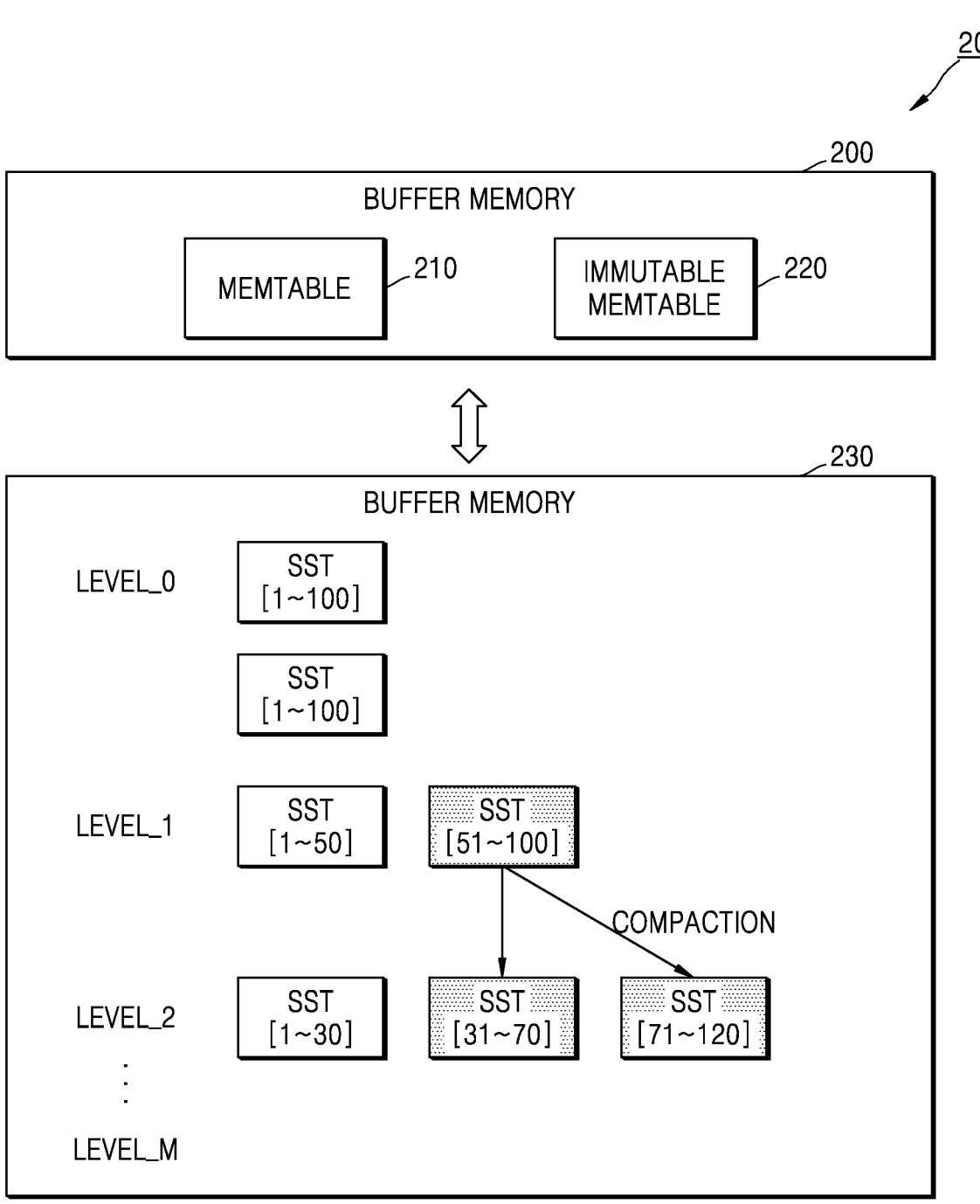
FIG. 2 is a block diagram illustrating a cluster computing system according to an example embodiment.

FIG. 2 is a block diagram illustrating a cluster computing system 20 according to an example embodiment. Hereinafter, FIG. 2 will be described with reference to FIG. 1.

Referring to FIG. 2, the cluster computing system 20 may include first buffer memory 200 and second buffer memory 230. The first buffer memory 200 may be provided in the host 100 and may correspond to the first buffer memory 104. The second buffer memory 230 may be provided in a computing node 140 and may correspond to the second buffer memory 134. The cluster computing system may include a key-value database or a key-value store and may perform a data operation such as insertion, deletion, or search of data. The key-value store may store the key-value pair by using a log structured merge (LSM) tree structure. For example, the cluster computing system 20 may be implemented with LevelDB, RocksDB, Cassandra, or Hbase.

The first processor 101 may store the key-value pair in the first buffer memory 200 according to a data write request from the client 110, and when a certain time elapses or an amount of data stored in the first buffer memory 200 is greater than a threshold value, the first processor 101 may control the key-value pair to be stored in the second buffer memory 230.

The cluster computing system 20 may classify data processing tasks respectively performed by the host 100 and the plurality of computing nodes 140. The host 100 may process data in the first buffer memory 200. A task node selected from among the plurality of computing nodes 140 by the task allocator 102 may process data in the second buffer memory 230 and may flush data from the second buffer memory 230 to the storage device 136.

When the cluster computing system 20 receives a data write request from the client 110, the data may be stored in a memtable 210 of the first buffer memory 200. When an amount of data stored in the memtable 210 is greater than a threshold value, the cluster computing system 20 may generate a new memtable 210 and may convert a memtable 210, which is greater than the threshold value, into an immutable memtable 220. The immutable memtable 220 may be converted into a sorted string table (SST) file sorted with respect to a key and may be stored in the second buffer memory 230.

The second buffer memory 230 may be configured at a plurality of levels, and for example, may be provided up to a level M LEVEL_M from a level 0 LEVEL_0. The SST file may be inserted from the level 0 LEVEL_0. Keys of a plurality of SST files included in the level 0 LEVEL_0 may overlap. For example, a plurality of SST files where a key range of 1 to 100 overlaps may be stored in the level 0 LEVEL_0.

As data is continuously written to the second buffer memory 230, an amount of data stored in each level may exceed a predetermined threshold value. The second processor 132 may merge (compaction) at least some SST files, included in a corresponding level, with SST files of a lower level. For example, when an amount of data stored in a level 1 LEVEL_1 is greater than a predetermined threshold value, the second processor 132 may merge SST files of a level 2 LEVEL_2 with SST files, where a key range overlaps, of SST files of the level 1 LEVEL_1. For example, an SST file, having a key range of 51 to 100, of the level 1 LEVEL_1 may be merged and sorted with an SST file, having a key range of 31 to 70, of the level 2 LEVEL_2 and an SST file, having a key range of 71 to 120, of the level 2 LEVEL_2. The cluster computing system 10 may remove pieces of key information which overlap, on the basis of a compaction task, thereby enhancing a response time corresponding to a data search request.

Figure 3:
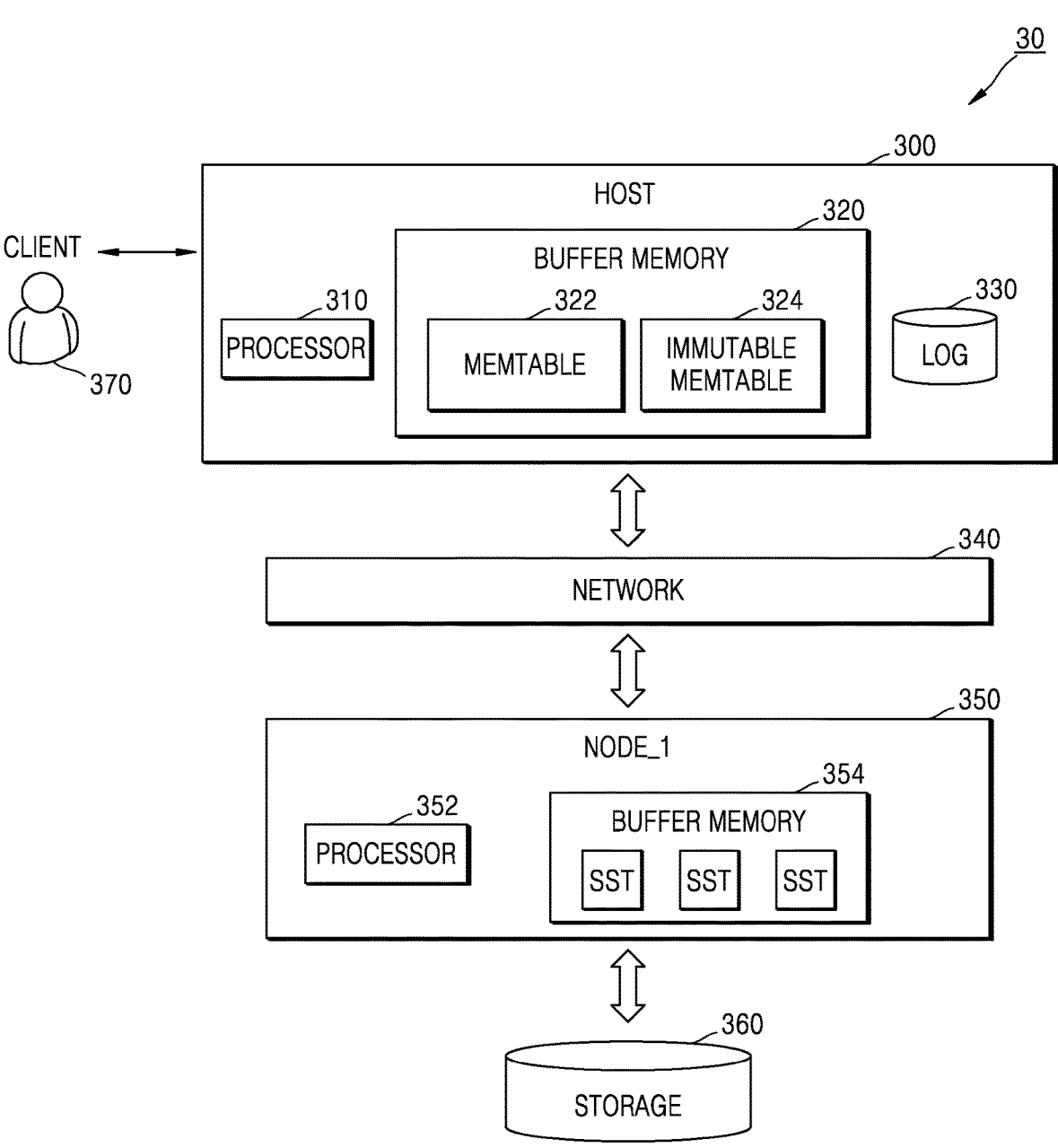
FIG. 3 is a block diagram illustrating a cluster computing system according to an example embodiment.

FIG. 3 is a block diagram illustrating a cluster computing system 30 according to an example embodiment.

Referring to FIG. 3, the cluster computing system 30 may include a host 300, a network 340, a first computing node 350, and a storage device 360. FIG. 2 may be a diagram describing a process where a task allocator (102 of FIG. 1) selects the first computing node 350 as a task node and offloads a background task to the first computing node 350. For example, the first computing node 350 may be selected as the task node from among a plurality of computing nodes.

The host 300 may include a first processor 310 and a first buffer memory 320. When a data insertion request is received from the client 370, the first processor 310 may store data in the first buffer memory 320. The first processor 310 may store data in a memtable 322 of the first buffer memory 320. The memtable 322 may be a memory-based storage which stores a key-value pair and may have a predetermined storage capacity. When a size of data stored in the memtable 322 is greater than the predetermined storage capacity, the first processor 310 may convert the memtable 322 into a memtable (for example, immutable memtable 324) where it is impossible to change data. The immutable memtable 324 may be implemented as read-only. When the immutable memtable 324 is generated, the first processor 310 may convert the memtable 322 into an SST file sorted in a key order and may transmit the SST file to the first computing node 350 over the network 340.

According to an example embodiment, when a data insertion request is received from the client 370, the first processor 310 may write a log file in a log region 330. When a system crash or power loss occurs in the cluster computing system 30, data which is not yet written in the storage device 360 may be lost in the first buffer memory 320. The host 300 may write the log file in the log region 330 before storing data in the storage device 360 and may recover data on the basis of the log file, thereby ensuring the integrity of data. When an operation of flushing data from the first buffer memory 320 to the storage device 360 is completed, a log file corresponding to the flushed data may be deleted.

The first processor 310 may offload a compaction task and a flush task, performed on the SST file, to the first computing node 350. The first computing node 350 may include a second processor 352 which performs the compaction task and the flush task. The second processor 352 may receive the SST file from the host 300 over the network 340. The second processor 352 may divisionally store SST files, divided into a plurality of levels, in the second buffer memory 354 by using the LSM tree structure. When an amount of data stored in each level is greater than a predetermined threshold value, the second processor 352 may merge and sort at least some SST files, included in a corresponding level, with SST files of a lower level.

The second processor 352 may flush a compaction-completed SST file to the storage device 360 connected to the first computing node 350. The second processor 352 may transmit the compaction-completed SST file to a computing node other than the first computing node 350 on the basis of a task performance state of each of a plurality of computing nodes (140 of FIG. 1) configuring the cluster computing system 30.

Figure 4:
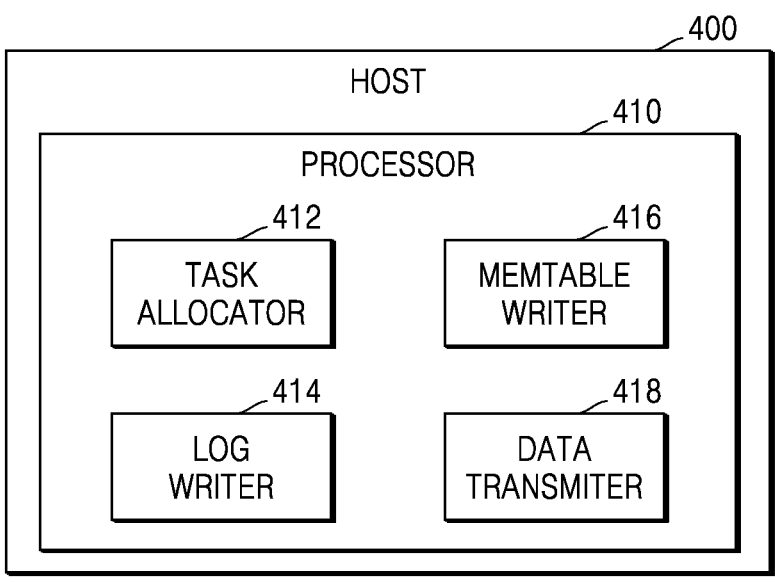
FIG. 4 is a block diagram illustrating a host according to an example embodiment.

FIG. 4 is a block diagram illustrating a host 400 according to an example embodiment. The host 400 illustrated in FIG. 4 may correspond to the host 300 of FIG. 3. Hereinafter, FIG. 4 will be described with reference to FIG. 3.

Referring to FIG. 4, a first processor 410 of the host 400 may include a task allocator 412, a log writer 414, a memtable writer 416, and a data transmitter 418.

The task allocator 412 may monitor a task performance state of each of a plurality of computing nodes (140 of FIG. 1). The task allocator 412 may select at least one task node for performing flush and compaction of data stored in the immutable memtable 324, on the basis of the task performance state. For example, the selecting the task node on the basis of the task performance state may be based on at least one of the type and number of tasks performed by each of the plurality of computing nodes (140 of FIG. 1), a task performing time for performing the tasks, and the number of files on which flush has been performed for each node. Furthermore, the task allocator 412 may receive information about the task performance state from the plurality of computing nodes (140 of FIG. 1), and thus, may update task states of the plurality of computing nodes (140 of FIG. 1) in real time.

The log writer 414 may write data, received from the client 370, in the log region 330 before data is stored in the storage device 360. When a system crash or power loss occurs in the cluster computing system 30, the host 400 may recover data on the basis of the data written in the log region 330, thereby ensuring the atomicity and persistency of data.

The memtable writer 416 may store data, which has been written in the log region 330, in the memtable 322. When a size of data stored in the memtable 322 is greater than a predetermined threshold value, the memtable writer 416 may convert the memtable 322 into a memtable (for example, the immutable memtable 324) where it is impossible to change data. The memtable writer 416 may generate a new memtable 322, for adding new data.

The data transmitter 418 may control data, stored in the immutable memtable 324, to be transmitted to a task node. For example, the task allocator 412 may select the first computing node 350 as a task node on the basis of the task performance state of each of the plurality of computing nodes (140 of FIG. 1). The data transmitter 418 may receive information about the first computing node 350 from the task allocator 412 and may control the data, stored in the immutable memtable 324, to be transmitted to the first computing node 350. At this time, the data transmitter 418 may convert the data, stored in the immutable memtable 324, into an SST file sorted in a key order and may control transmission of the SST file to the first computing node 350.

Figure 5:
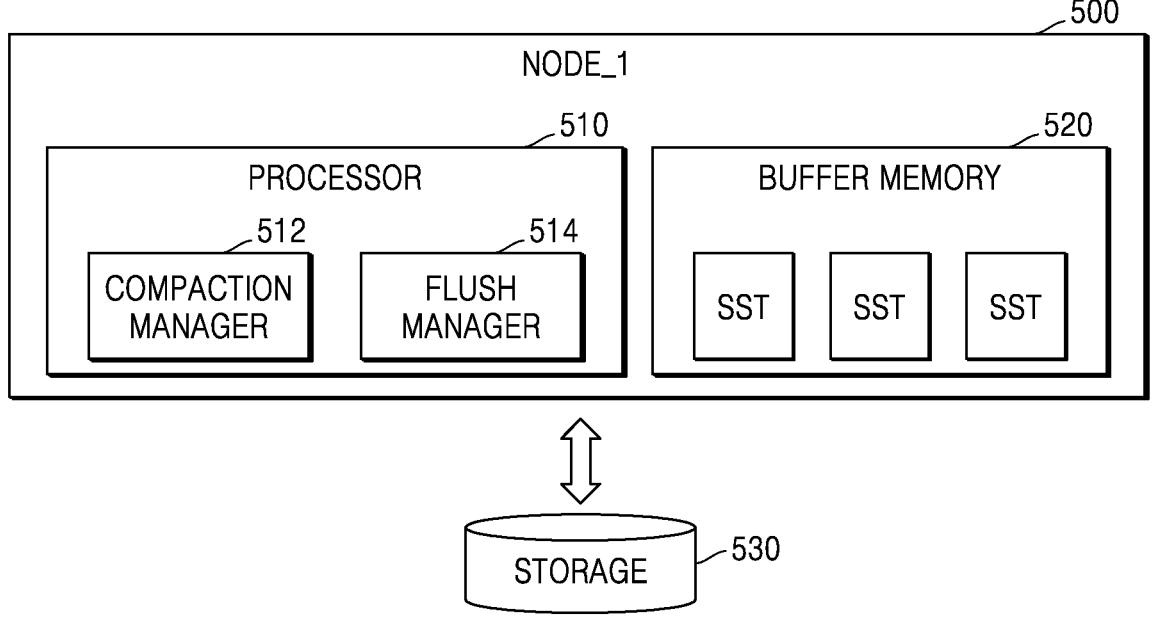
FIG. 5 is a block diagram illustrating a first computing node according to an example embodiment.

FIG. 5 is a block diagram illustrating a first computing node 500 according to an example embodiment. The first computing node 500 illustrated in FIG. 5 may correspond to one of the plurality of computing nodes 140 of FIG. 1.

Referring to FIG. 5, the first computing node 500 may include a second processor 510 and a second buffer memory 520 and may be connected to a storage device 530. The second processor 510 may include a compaction manager 512, which performs compaction of data in the second buffer memory 520, and a flush manager 514 which flushes data from the second buffer memory 520 to the storage device 530.

The compaction manager 512 may monitor a compaction performing condition in the second buffer memory 520 and may perform a compaction task. For example, when the number of SST files stored in each level in the second buffer memory 520 is more than a predetermined number, the compaction manager 512 may select an SST file on which compaction is to be performed and may perform a compaction task between SST files. The compaction manager 512 may transmit, to a task allocator (102 of FIG. 1), information about the initial and end states of compaction. The task allocator (102 of FIG. 1) may update a task state of each of a plurality of computing nodes (140 of FIG. 1) in real time on the basis of information about the task state received from the compaction manager 512, and based thereon, may select a task node.

When an amount of data stored in the second buffer memory 520 is greater than a predetermined threshold value, the compaction manager 512 may transmit a flush start command to the flush manager 514. According to the flush start command, the flush manager 514 may flush SST files, on which compaction is completed, in the second buffer memory 520, to the storage device 530 connected to the first computing node 500. Alternatively, the flush manager 514 may transmit SST files, on which compaction is completed, to another computing node connected to a network (120 of FIG. 1).

Figure 6:
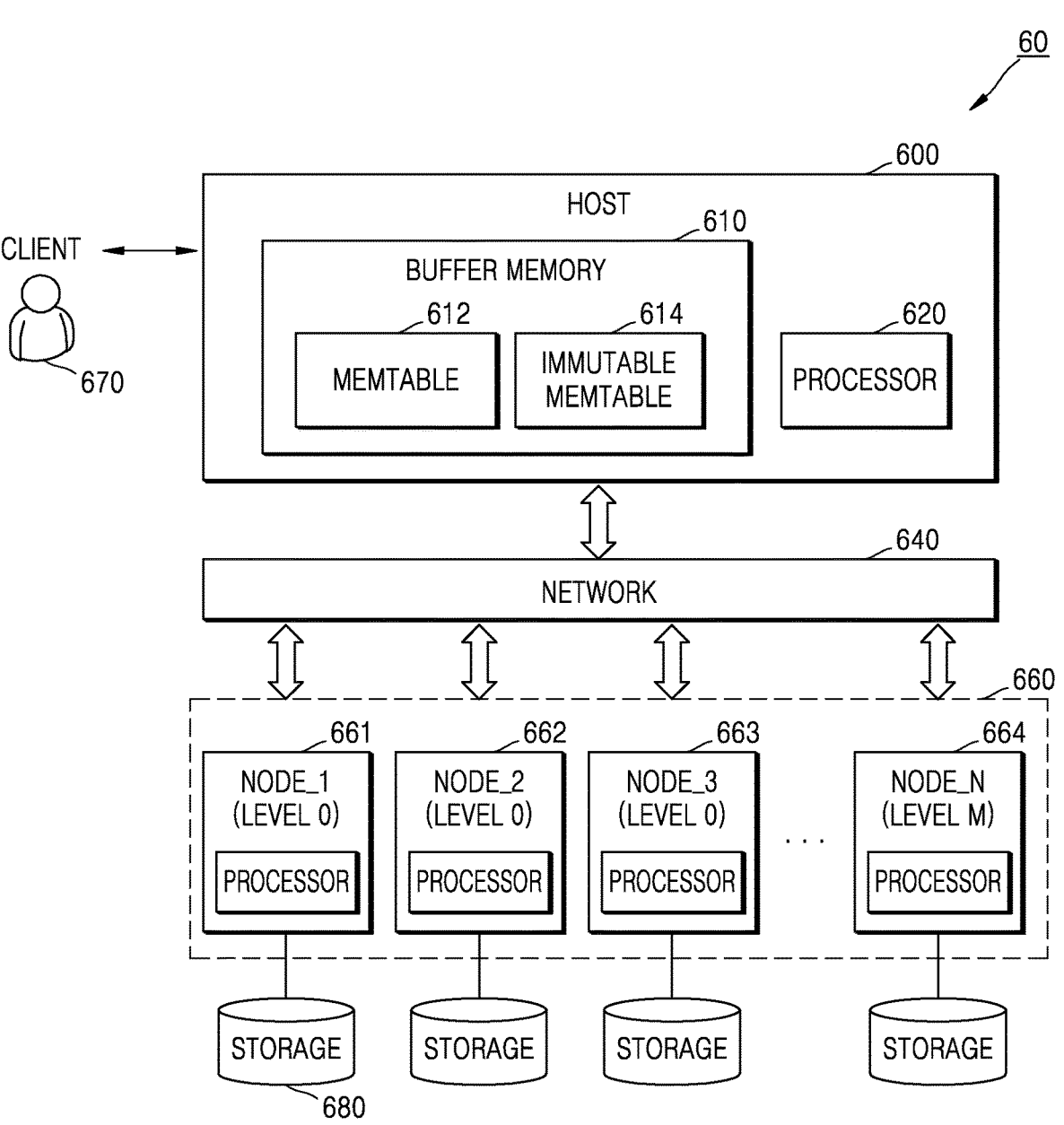
FIG. 6 is a block diagram illustrating a cluster computing system according to an example embodiment.

FIG. 6 is a block diagram illustrating a cluster computing system 60 according to an example embodiment.

Referring to FIG. 6, the cluster computing system 60 may include a host 600, a network 640, a plurality of computing nodes 660, and a plurality of storage devices 680 respectively corresponding to the plurality of computing nodes 660. Data stored in the plurality of storage devices 680 may be divided into a plurality of levels, and each of the plurality of computing nodes 660 may correspond to one of the plurality of levels.

The host 600 may receive a data search request from a client 670. For example, the data search request may be a point query including a single key, or may be a range query including a plurality of keys between an upper limit and a lower limit.

The data search request received from the client 670 may include key information. The host 600 may search for data, corresponding to requested key information, in a memtable 612 and an immutable memtable 614 of a first buffer memory 610. When the data corresponding to the requested key information is found in the first buffer memory 610, the host 600 may perform a validity test on the found data and may classify valid data. The host 600 may return the valid data to the client 670.

On the other hand, when the data corresponding to the requested key information is not found in the first buffer memory 610, the host 600 may transmit key information, received from the client 670, to the plurality of computing nodes 660. The plurality of computing nodes 660 may search for data, corresponding to the key information, in SST files stored in a corresponding predetermined level.

Referring to FIG. 2 as a comparative example, a key-value database may search for the memTable 210, the immutable memtable 220, and SST files included in the level 0 LEVEL_0 to the level M LEVEL_M in order, and thus, may find valid data. Particularly, each of the SST files included in the level 0 LEVEL_0 may include overlapping key information, and it may be required to sequentially search for all of the SST files included in the level 0 LEVEL_0. Therefore, there may be a problem where a response time of a database is slowed.

The cluster computing system 60 according to an example embodiment may perform a data search task in parallel in the host 600 and the plurality of computing nodes 660, thereby enhancing a response time. Each of the plurality of computing nodes 660 may search for files stored in a corresponding predetermined level. For example, each of a first computing node 661, a second computing node 662, and a third computing node 663 may search for data, corresponding to requested key information, in parallel in the SST files included in the level 0 LEVEL_0. Simultaneously, an $N^{th}$ computing node 664 may search for the data, corresponding to the requested key information, in the SST files included in the level M LEVEL_M. Valid data found in each of the plurality of computing nodes 660 may be returned to the host 600.

Figure 7:
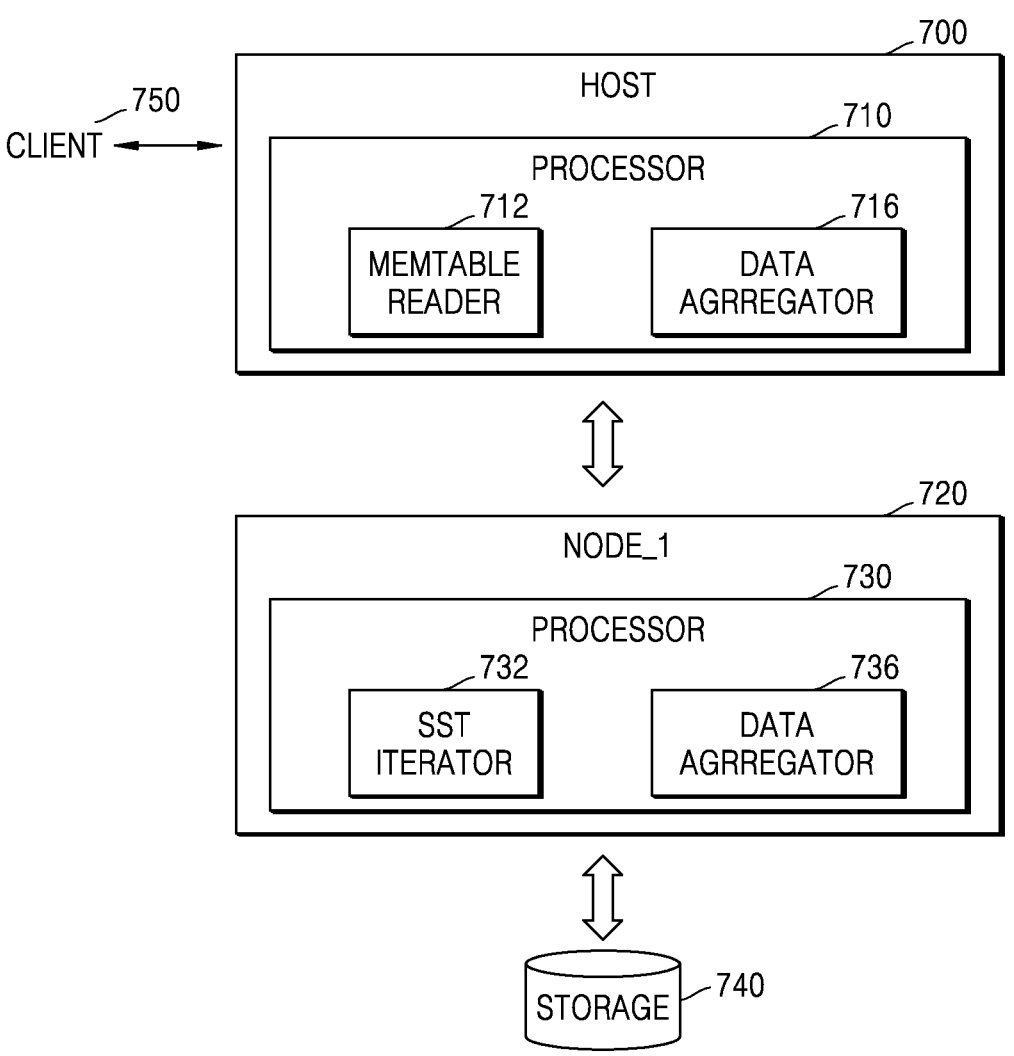
FIG. 7 is a block diagram illustrating a cluster computing system according to an example embodiment.

FIG. 7 is a block diagram illustrating a cluster computing system 70 according to an example embodiment. Hereinafter, FIG. 7 will be described with reference to FIG. 6.

Referring to FIG. 7, the cluster computing system 70 may include a host 700, a first computing node 720, and a storage device 740. The host 700 illustrated in FIG. 7 may correspond to the host 600 of FIG. 6, and the first computing node 720 may correspond to the first computing node 661 of FIG. 6.

The host 700 may include a first processor 710, and the first processor 710 may include a memtable reader 712 and a first data aggregator 716. The memtable reader 712 may search for data, corresponding to requested key information, in the first buffer memory 610. The memtable reader 712 may search data in the memtable 612 and the immutable memtable 614. For example, when pieces of data corresponding to the key information are not found in the memtable 612 and the immutable memtable 614, the first processor 710 may transmit the key information to the plurality of computing nodes 660 to offload data search processing.

The first data aggregator 716 may receive a data value found from each of the plurality of computing nodes 660 and may generate a valid data value or a valid data set. For example, when the pieces of data corresponding to the key information are received from the plurality of computing nodes 660, the first data aggregator 716 may compare timestamps included in the pieces of data to classify the most recent data into valid data. The first data aggregator 716 may generate a valid data set and may return the valid data set to a client 750.

The first computing node 720 may include a second processor 730, and the second processor 730 may include an SST iterator 732 and a second data aggregator 736. Only the first computing node 720 is illustrated in FIG. 7, but each of the plurality of computing nodes 660 may be configured identical to the first computing node 720.

The SST iterator 732 may iterate SST files stored in the storage device 740 to search for data corresponding to requested key information. The SST iterator 732 may iterate files included in a predetermined level for each of a plurality of computing nodes (660 of FIG. 6) and may search data in parallel in the plurality of computing nodes (660 of FIG. 6). The second data aggregator 736 may perform a validity test on data found in the storage device 680 to classify valid data and may generate a valid data set. The second data aggregator 736 may return the valid data set to the host 600.

Figure 8:
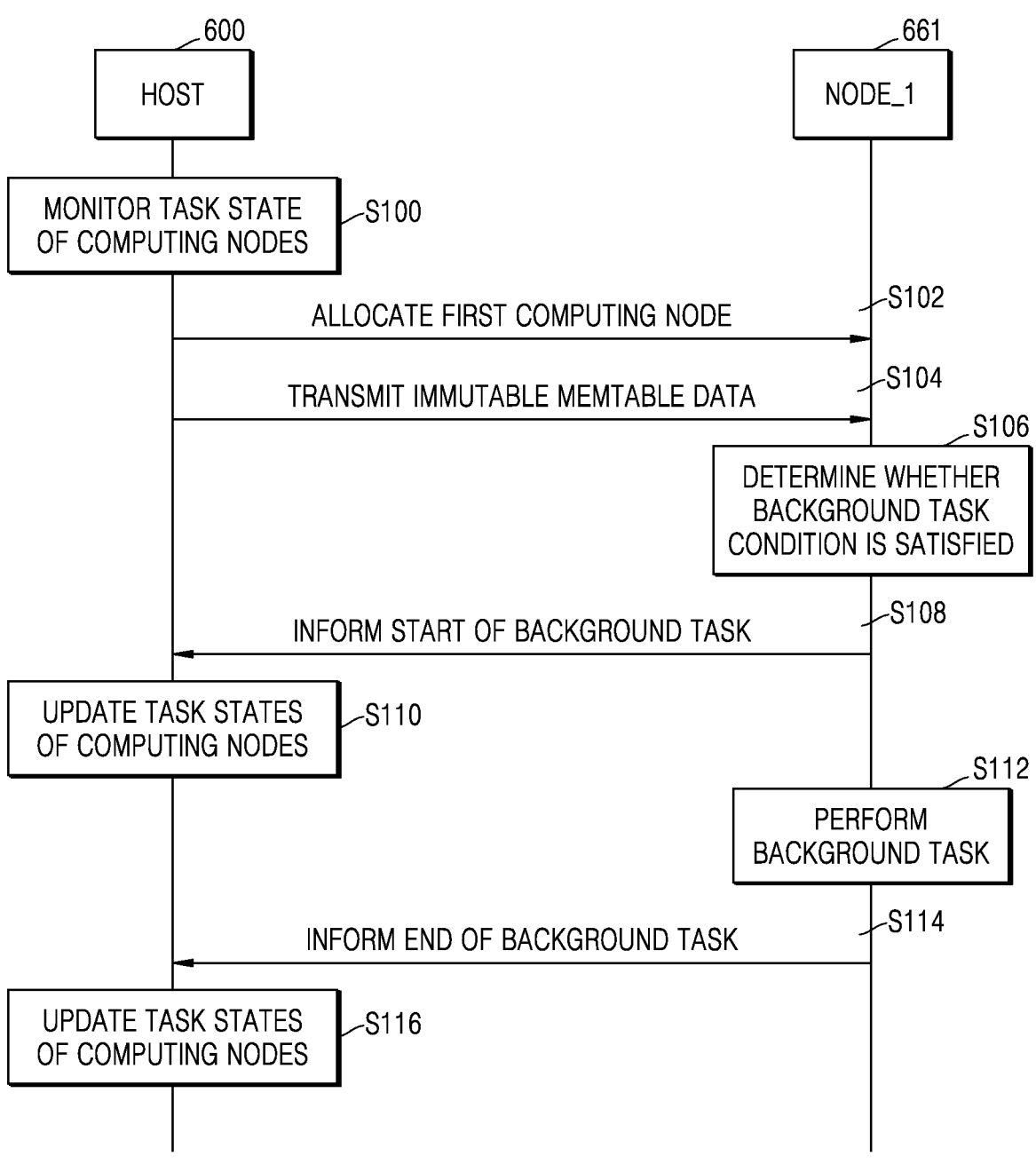
FIG. 8 is a flowchart illustrating a background task performing method of a cluster computing system, according to an example embodiment.

FIG. 8 is a flowchart illustrating a background task performing method of the cluster computing system 60, according to an example embodiment.

Referring to FIG. 8, in operation S100, the host 600 may monitor a task state of each of a plurality of computing nodes 660. When an immutable memtable is generated in a first buffer memory 610, the host 600 may select a task node from among the plurality of computing nodes 660 for performing a background task. Based on the task state of each of the plurality of computing nodes 660, the host 600 may select, as a task node, a node which is not currently performing a current background task and where there is no background task which is to be performed in the near future.

In operation S102, the host 600 may identify first computing node 661 is not currently performing a background task and does not have a background task scheduled to be performed in the near feature, and may therefore select the first computing node 661 as a task node. That is, the host 600 may offload the background task to the first computing node

661. For example, the background task may be a compaction task or a flush task to a storage device.

In operation S104, the host 600 may transmit data, stored in the immutable memtable, to the first computing node 661 over the network 640. The host 600 may convert the data, stored in the immutable memtable, into an SST file and may transmit the SST file.

In operation S106, the first computing node 661 may determine whether a background task condition is satisfied. For example, when the number of SST files included in each level is more than a predetermined number, the first computing node 661 may start to perform a compaction task between SST files.

In operation S108, the first computing node 661 may inform the host 600 of the start of the background task. In operation S110, the host 600 may update the task state of each of the plurality of computing nodes, based on being informed of the start of the background task according to information received from the first computing node 661. The host 600 may change a task state of the first computing node 661 to a state where the background task is being performed and may select, as task nodes, nodes other than the first computing node 661.

In operation S112, the first computing node 661 may perform the background task. For example, the first computing node 661 may perform the compaction task between the SST files, or may flush a compaction-completed SST file to the storage device.

In operation S114, the first computing node 661 may inform the host 600 of the end of the background task. In operation S116, the host 600 may update a task state of the first computing node 661, based on being informed of the end of the background task according to information received from the first computing node 661. The host 600 may change the task state of the first computing node 661 to a state where the background task ends and may select the first computing node 661 as a task node for performing a next background task.

Figure 9:
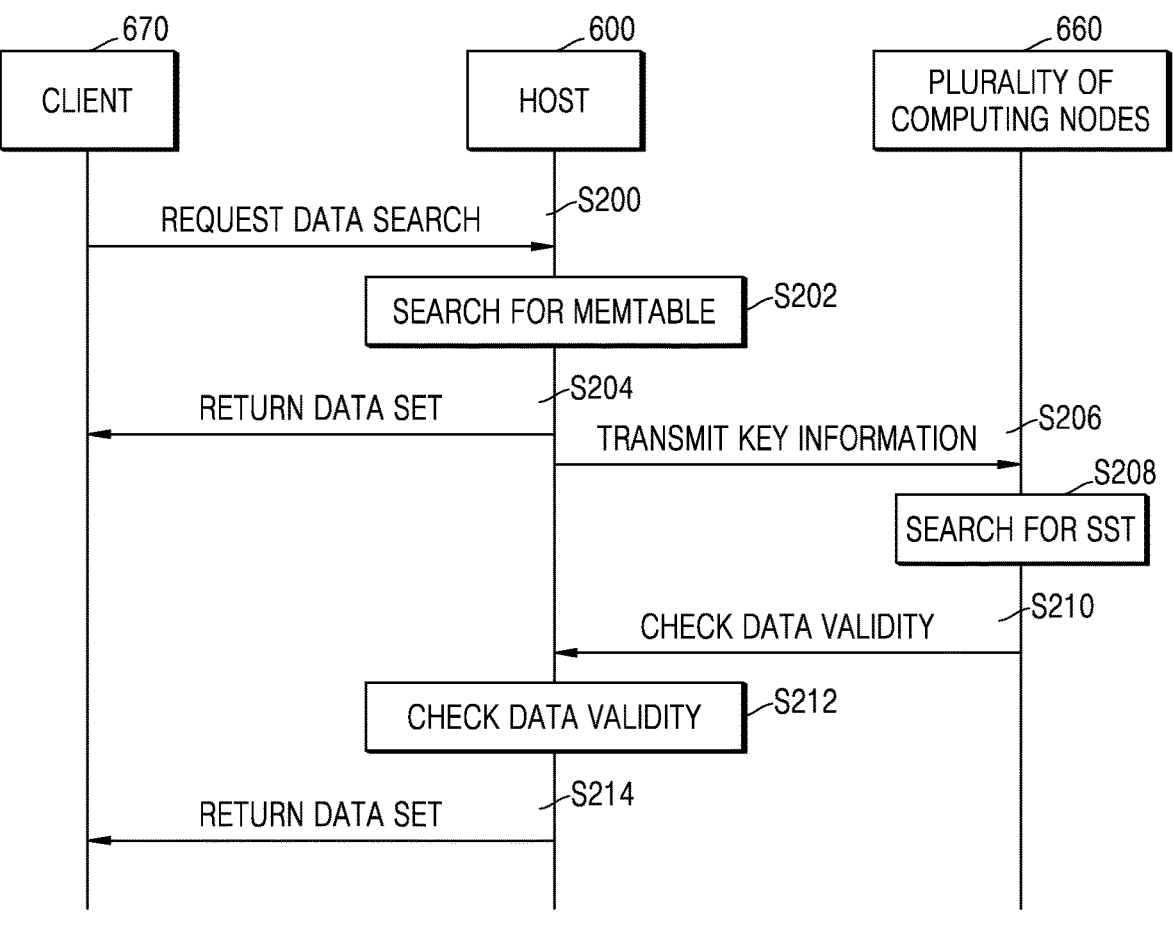
FIG. 9 is a flowchart illustrating a data search method of a cluster computing system, according to an example embodiment.

FIG. 9 is a flowchart illustrating a data search method of a cluster computing system 60, according to an example embodiment.

Referring to FIG. 9, in operation S200, a client 670 may request data search from a host 600. A data search request may be a point query and may include single key information, or may be a range query and may include key range information having an upper limit and a lower limit.

In operation S202, the host 600 may search a memtable 612 and an immutable memtable 614, which are stored in a first buffer memory 610. In operation S204, when data corresponding to key information is found in the memtable 612 or the immutable memtable 614, the host 600 may return a data set to the client 670.

On the other hand, in operation S206, when the data corresponding to the key information is not found in the memtable 612 or the immutable memtable 614, the host 600 may transmit the key information to a plurality of computing nodes 660.

In operation S208, the plurality of computing nodes 660 may search for data corresponding to received key information in SST files. In some example embodiments, each of the plurality of computing nodes 660 may search for SST files included in a predetermined level, and data search may be performed in parallel in the plurality of computing nodes 660.

In operation S210, when the data corresponding to the key information is found in the SST file, the plurality of computing nodes 660 may return the data to the host 600.

In operation S212, the host 600 may perform a validity test on data received from the plurality of computing nodes 660. For example, when pieces of data corresponding to the key information are received, the plurality of computing nodes 660 may compare timestamps included in the pieces of data to classify the most recent data into valid data.

In operation S214, the host 600 may generate a data set from the classified valid data and may return the data set to the client 670. Alternatively, the host 600 may return valid single data to the client 670.

Figure 10:
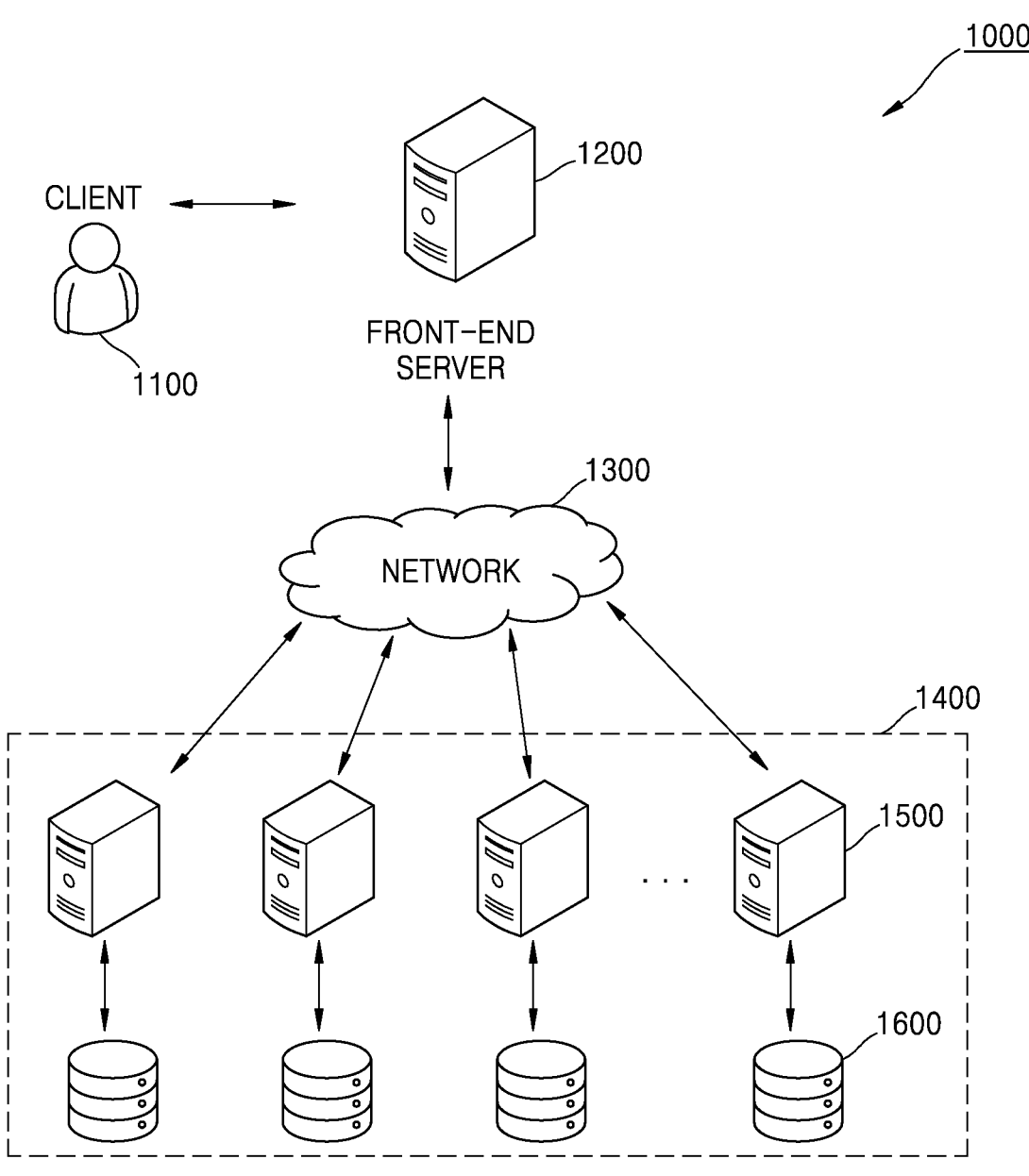
FIG. 10 is a block diagram of a data center including a cluster computing system according to an example embodiment.

FIG. 10 is a block diagram of a data center 1000 to which a cluster computing system according to an example embodiment is applied.

Referring to FIG. 10, the data center 1000 may include a frontend server 1200, a network 1300, and a plurality of database servers 1400. The data center 1000 may receive a request of the client 1100 to provide a resource of a computer system. For example, the data center 1000 may be used for a web server, a database, a virtual machine, a software application, etc.

When a data write request is received from a client 1100, the frontend server 1200 may preferentially process data in a first buffer memory and may return the processed data to the client 1100, thereby enhancing a response time. The frontend server 1200 may monitor an available resource in the plurality of database servers 1400 and may distribute a background task in real time, thereby providing the client 1100 with a service having stable performance.

Each of the plurality of database servers 1400 may include a server 1500 and a database 1600. The plurality of database servers 1400 may receive data from the frontend server 1200 over the network 1300. The plurality of database servers 1400 may perform the background task on the data received from the frontend server 1200. For example, the plurality of database servers 1400 may perform compaction of the data and a flush task to the database 1600.

Each server 1500 configuring the plurality of database servers 1400 may be implemented as a single board computer. The single board computer may operate as a low power server, and power may be efficiently used in the data center 1000. Furthermore, the single board computer may operate as a subminiature server, and a space may be efficiently used in the data center 1000.

When the frontend server 1200 receives the data write request from the client 1100, each of the plurality of database servers 1400 may search for data stored in the database 1600 in parallel. As search is performed in parallel in the database 1600, the performance and response time of the data center 1000 may be enhanced.

While aspects of example embodiments have been particularly shown and described, it will be understood that various changes in form and details may be made therein without departing from the spirit and scope of the following claims.

What is claimed is:

1. A cluster computing system comprising:

a host comprising a first processor and a first buffer memory;

a plurality of computing nodes, each of the plurality of computing nodes comprising a second processor and a second buffer memory configured to store data received from the host, wherein each piece of the stored data is associated with a key, and a plurality of levels of sorted string table (SST) files are respectively associated with ranges of keys, wherein the plurality of levels comprise a first level and a second level, and wherein the plurality of computing nodes comprises at least one first computing node associated with the first level and at least one second computing node associated with the second level;

a network configured to connect the host and the plurality of computing nodes; and a plurality of storage devices respectively corresponding to the plurality of computing nodes, wherein the first processor is configured to:

distribute a background task to a task node from among the plurality of computing nodes based on a task performance state of each of the plurality of computing nodes, wherein the background task comprises flushing SST files generated based on an immutable memtable stored in the first buffer memory to a storage device connected to the task node; and receive data from the plurality of computing nodes, wherein the received data comprises first data corresponding to the first level that is received from the at least one first computing node and second data corresponding to the second level that is received from the at least one second computing node, and wherein the second processor of the task node is configured to:

flush the SST files stored from the second buffer memory to the storage device, the SST files being received by the second buffer memory from the first buffer memory via the network; and control a compaction manager to, based on a number of SST files stored in a particular level of the plurality of levels exceeding a threshold value, perform compaction between the SST files of the particular level and the SST files of a level lower than the particular level, wherein the SST files of the particular level and the SST files of the lower level have an overlapping key range, and wherein the compaction includes removing the keys within the overlapping key range.

2. The cluster computing system of claim 1, wherein the cluster computing system comprises a key-value database configured with the plurality of levels.

3. The cluster computing system of claim 2, wherein the first processor includes a task allocator, a log writer, a memtable writer, and a data transmitter.

4. The cluster computing system of claim 3, wherein the second processor is further configured to control the compaction manager to transfer, to the task allocator, information indicating a start time or an end time for performing the compaction.

5. The cluster computing system of claim 4, wherein the first processor is further configured to control the task allocator to update a task state of each of the plurality of computing nodes based on the information indicating the start time or the end time for performing the compaction.

6. The cluster computing system of claim 1, wherein the second processor and the second buffer memory are provided on a single board.

7. The cluster computing system of claim 1, wherein the task performance state is based on any one or any combination of a type of task, a number of tasks, and a task performance time, of tasks performed in each of the plurality of computing nodes.

8. The cluster computing system of claim 1, wherein the background task comprises performing compaction of the SST files.

9. The cluster computing system of claim 8, wherein the SST files flushed from the second buffer memory to the storage device comprise compacted files obtained by performing the compaction of the SST files.

10. The cluster computing system of claim 1, wherein the second processor is further configured to control a flush manager to, based on a size of data stored in the second buffer memory exceeding a threshold value, flush a compacted file comprising the SST files to the storage device connected to the task node.

11. The cluster computing system of claim 1, wherein the first processor is further configured to control a data transmitter configured to, based on a size of data stored in the first buffer memory exceeding a threshold value, flush at least a portion of the data to the second buffer memory of the task node.

12. A cluster computing system comprising:
a host comprising a first processor and a first buffer memory;
a plurality of computing nodes, each of the plurality of computing nodes comprising a second processor, wherein the plurality of computing nodes comprises at least one first computing node associated with a first level of a plurality of levels of sorted string table (SST) files and at least one second computing node associated with a second level of the plurality of levels;
a network configured to connect the host and the plurality of computing nodes; and
a plurality of storage devices respectively corresponding to the plurality of computing nodes, wherein the plurality of storage devices are configured to store data received from the host, wherein each piece of the stored data is associated with a key, the plurality of levels are respectively associated with ranges of keys, and the plurality of levels comprise the first level and the second level,
wherein the first processor is configured to process a data search request to receive data, wherein the data search request includes key information received from a client, and wherein the received data comprises first data corresponding to the first level that is received from the at least one first computing node and second data corresponding to the second level that is received from the at least one second computing node, and
wherein the second processor of each of the plurality of computing nodes is configured to:
receive the key information from the host, and return the data including the key information to the host, the SST files being generated by the host based on an immutable memtable stored in the first buffer memory, and
control a compaction manager to, based on a number of SST files stored in a particular level of the plurality of levels exceeding a threshold value, perform compaction between the SST files of the particular level and the SST files of a level lower than the particular level, wherein the SST files of the particular level and the SST files of the lower level have an overlapping key range, and wherein the compaction includes removing the keys within the overlapping key range.

13. The cluster computing system of claim 12, wherein the cluster computing system comprises a key-value database configured with the plurality of levels.

14. The cluster computing system of claim 13, wherein each of the plurality of storage devices corresponds to a predetermined level from among the plurality of levels, and wherein the second processor of each of the plurality of computing nodes is further configured to control a sorted string table (SST) iterator to obtain a plurality of SST files included in the predetermined level for the data including the key information.

15. The cluster computing system of claim 12, wherein the first processor includes a task allocator, a log writer, a memtable writer, and a data transmitter.

16. The cluster computing system of claim 12, wherein a valid data value is a most recently received data value of a plurality of data values, each of which includes the key information.

17. The cluster computing system of claim 12, wherein the first processor is further configured to control a data aggregator to generate a set of data returned from each of the plurality of computing nodes and to provide the set of data to the client.

18. An operating method of a cluster computing system, the operating method comprising:
receiving, by a host, a data insertion request from a client;
transmitting, by the host, data stored in a first buffer memory of the host to a second buffer memory of a task node from among a plurality of computing nodes based on a task performance state of each of the plurality of computing nodes, wherein pieces of data stored in the plurality of computing nodes are associated with keys, and a plurality of levels of sorted string table (SST) files are respectively associated with ranges of keys, wherein the plurality of levels comprise a first level and a second level, and wherein the plurality of computing nodes comprises at least one first computing node associated with the first level and at least one second computing node associated with the second level;
performing, by the task node, a background task, wherein the background task comprises:
flushing SST files generated based on an immutable memtable stored in the first buffer memory to a storage device connected to the task node, and
controlling a compaction manager to, based on a number of SST files stored in a particular level of the plurality of levels exceeding a threshold value, perform compaction between the SST files of the particular level and the SST files of a level lower than the particular level, wherein the SST files of the particular level and the SST files of the lower level have an overlapping key range, and wherein the compaction includes removing the keys within the overlapping key range;
updating, by the host, the task performance state of each of the plurality of computing nodes; and
receiving data from the plurality of computing nodes, wherein the received data comprises first data corresponding to the first level that is received from the at least one first computing node and second data corresponding to the second level that is received from the at least one second computing node.

19. The operating method of claim 18, wherein the performing of the background task further comprises:
flushing, by the task node, compacted data to the storage device connected to the task node.

20. The operating method of claim 19, wherein the flushing is performed based on a condition for flushing being satisfied.

* * * * *